(12) United States Patent  
Harter et al.

(10) Patent No.: US 8,763,327 B2
(45) Date of Patent: Jul. 1, 2014

(54) PANELED PARTITION HAVING A RETRACTABLE EXTENSION

(71) Applicant: Honda Motor Co., Ltd., Tokyo (JP)

(72) Inventors: Eugene Harter, Summerfield, NC (US); Jeffrey Scott Miller, Summerfield, NC (US); Christopher Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/632,649

(22) Filed: Oct. 1, 2012

(65) Prior Publication Data

US 2013/0111835 A1 May 9, 2013

Related U.S. Application Data

(60) Provisional application No. 61/544,456, filed on Oct. 7, 2011.

(51) Int. Cl.
*E04B 2/74* (2006.01)

(52) U.S. Cl.
USPC .......... 52/238.1; 49/370; 244/118.5; 160/222

(58) Field of Classification Search
USPC ........ 52/238.1, 243.1; 49/360, 362, 363, 366, 49/370, 379, 279, 280, 281; 244/118.5, 244/121, 129.4, 129.5; 160/211, 222
See application file for complete search history.

(56) References Cited

U.S. PATENT DOCUMENTS

| | | | | |
|---|---|---|---|---|
| 1,907,799 | A * | 5/1933 | Hardtke | 49/210 |
| 1,928,056 | A * | 9/1933 | Holt et al. | 49/375 |
| 2,212,220 | A * | 8/1940 | Zwierzina | 74/89.17 |
| 2,253,134 | A * | 8/1941 | Morrison | 296/155 |
| 2,673,108 | A * | 3/1954 | Roller | 292/144 |
| 3,706,163 | A * | 12/1972 | Pickles | 49/362 |
| 4,535,578 | A * | 8/1985 | Gerken | 52/243.1 |
| 4,597,549 | A * | 7/1986 | Ryan | 244/118.5 |
| 4,911,219 | A * | 3/1990 | Dalrymple | 160/118 |
| 4,989,808 | A * | 2/1991 | Spraggins et al. | 244/118.5 |
| 5,481,834 | A | 1/1996 | Kowalczyk et al. | |
| 6,035,579 | A * | 3/2000 | Staser et al. | 49/351 |
| 6,186,444 | B1 * | 2/2001 | Steel | 244/129.5 |
| 8,038,100 | B2 * | 10/2011 | Osborne et al. | 244/129.5 |
| 2007/0125000 | A1 * | 6/2007 | Fenelon | 49/349 |
| 2009/0013605 | A1 | 1/2009 | Seo | |
| 2010/0236152 | A1 * | 9/2010 | Guzzi-Nicolia | 49/372 |
| 2011/0094161 | A1 | 4/2011 | Rees | |

FOREIGN PATENT DOCUMENTS

| | | |
|---|---|---|
| EP | 1538298 | 6/2005 |
| GB | 296186 | 8/1928 |

OTHER PUBLICATIONS

Extended European Search Report dated Jan. 30, 2013 in European Application No. EP 12 18 7436.

\* cited by examiner

*Primary Examiner* — Brian Glessner
*Assistant Examiner* — Adam Barlow
(74) *Attorney, Agent, or Firm* — Plumsea Law Group, LLC

(57) ABSTRACT

A paneled partition assembly is disclosed that can be used to selectively separate a first space from a second space. The paneled partition assembly can cover an opening when in a closed and extended position and uncover the opening when in an opened and retracted position. The paneled partition assembly can include a first panel and a second panel configured such that rotation of a handle on the first panel causes linear movement of the second panel. The partition assembly can include a pair of mating assemblies that selectively move from open and retracted positions on opposite sides of an opening to closed and extended positions in which opposite leading edges abut one another.

20 Claims, 13 Drawing Sheets

PANELED PARTITION HAVING A RETRACTABLE EXTENSION

BACKGROUND OF THE INVENTION

1. Field of the Invention

The present invention relates to a paneled partition, and more particularly to a paneled partition that extends to close an opening and retracts to uncover the opening by the movement of an actuator that causes translation of an extension.

2. Description of Related Art

Partitions are used in a variety of environments to provide separation between indoor spaces and between indoor and outdoor spaces. Examples of partitions include doors, windows, cubicles, hanging walls, accordion walls, etc. Partitions may be configured to be installed in buildings, other structures, or vehicles, such as airplanes, boats, trains, buses, and cars.

Often, partitions are opened by rotating the partition at least ninety degrees into a room to allow individuals to see and walk through the resulting opening into another space. For example, hinged doors and hinged window shutters often function in this manner.

Some partitions are opened by sliding a multi-paneled partition so that it folds one panel against another. In order to open and close such a partition, it must extend into the space. These partitions can also be cumbersome to maneuver if the folded area does not automatically actuate and the individual must press the panels slightly to force the panels to fold. Such partitions are often described as accordion-type because they move like an accordion. Accordion-type partitions that include only two panels are often called bifolds.

Accordion-type or hinged partitions require open space in the immediate vicinity of the partition so that the partition can be swung or folded open and closed. Such space requirements are not always feasible in small spaces like vehicles or small buildings. Such designs may also be cumbersome for someone with mobility issues, such as a wheelchair bound individual, to maneuver themselves clear of the partition and open the partition simultaneously. In other words, hinged partitions may cause accessibility issues.

Other partitions are opened by sliding one or more panels in parallel relation to a wall. These are particularly useful when the partition is large and therefore impractical for a hinge to hold. The design allows for increased flexibility in the size of the opening. If a recess is provided for the partition, this type of door is typically called a pocket door. Airplane window shades function in a similar manner. Airplane window shades often slide into and out of a recess to alternately cover or uncover the window of the airplane cabin.

A pocket-type design is advantageous in areas where there is little room on either side of a wall for a partition to protrude. However, this design generally does not optimize the interior wall space used. First, a frame is typically needed in the wall to support the mechanism. Second, the partition generally slides straight into the recess. As a result, the height and width of the recess is equal to or larger than the height and width of the partition. Additionally, the entire area of the recess should be clear of plumbing, electrical wiring, or other internal features. The amount of clearance required may not be feasible in smaller spaces.

Other designs include combinations of the previously mentioned types. For example, some cabinet doors swing outward and then rotate laterally using several hinges. As a final step, they slide backwards into a recess within the cabinet or into a space adjacent to the cabinet. This design includes both the advantages and disadvantages of the hinged and pocket designs.

While the art has addressed issues related to ease of use and space saving, additional space-saving designs are needed. These new designs should also be easy to use. Therefore, there is a need in the art for a system that addresses the shortcomings of the prior art discussed above.

SUMMARY OF THE INVENTION

A paneled partition assembly is disclosed. The paneled partition assembly can be used to selectively separate a first space from a second space. The paneled partition assembly can cover an opening when in a closed and extended position and uncover the opening when in an opened and retracted position. The paneled partition assembly can include a first panel and a second panel configured such that movement of a drive member on the first panel causes linear movement of the second panel. When the paneled partition assembly is in a closed and extended position, the plurality of panels can cover the opening regardless of the opening's shape, size, or irregularity. For example, when in a closed and extended position, a first panel can close a main portion of an opening and a second panel can extend from the first panel to cover a secondary portion of the opening.

Moving the paneled partition assembly from a closed and extended position to an open and retracted position and vice versa can include a simple multi-step process. For instance, when moving from an open and retracted position to a closed and extended position, as a first part of the process, a first panel can translate to a position that closes a main portion of the opening. Subsequently, as a second part of the process, while the first panel is in the closed position a driving member can be rotated to cause linear motion of a second panel from a retracted position to an extended position that covers a supplemental region of the opening. One or more of the panels can extend from and withdraw into an extension opening formed in another panel or a wall portion. When the paneled partition assembly is in an open and retracted position, the plurality of panels are moved and retracted to minimize space requirements. In moving between the closed and extended positions and the open and retracted positions, the panels translate fluidly with minimum user interaction.

In one aspect, the partition assembly includes a wall portion defining an opening and a plurality of panels arranged in communication with the wall portion and each other to selectively cover an opening when the plurality of panels are in a closed and fully extended position and to uncover the opening when the plurality of panels are in an open and retracted position. The plurality of panels can include a first panel having a selectively rotatable handle disposed thereon configured to rotate between a first position corresponding with a fully extended position and a second position corresponding with a retracted position. The plurality of panels can also include a second panel configured as a following panel and coupled with the first panel and the handle such that rotational movement of the handle causes linear movement of the second panel.

In another aspect, the partition assembly includes a pair of mating assemblies that selectively move from open and retracted positions in which the opening is exposed to closed and extended positions in which opposite leading edge portions of the assemblies abut one another. Each of the assemblies can include a main panel configured for selective linear movement between an open position disposed within a recess formed in one of the opposite wall portions defining the opening and a closed position extending out of the recess toward the opposite main panel. Each assembly can also include a descender panel configured for selective linear movement between a retracted position disposed within a descender recess formed in the main panel and a deployed position extending from the descender recess. Each assembly can further include a driving member on the main panel configured for selective movement between a deployed descender position and a retracted descender position.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS

Figure 1:
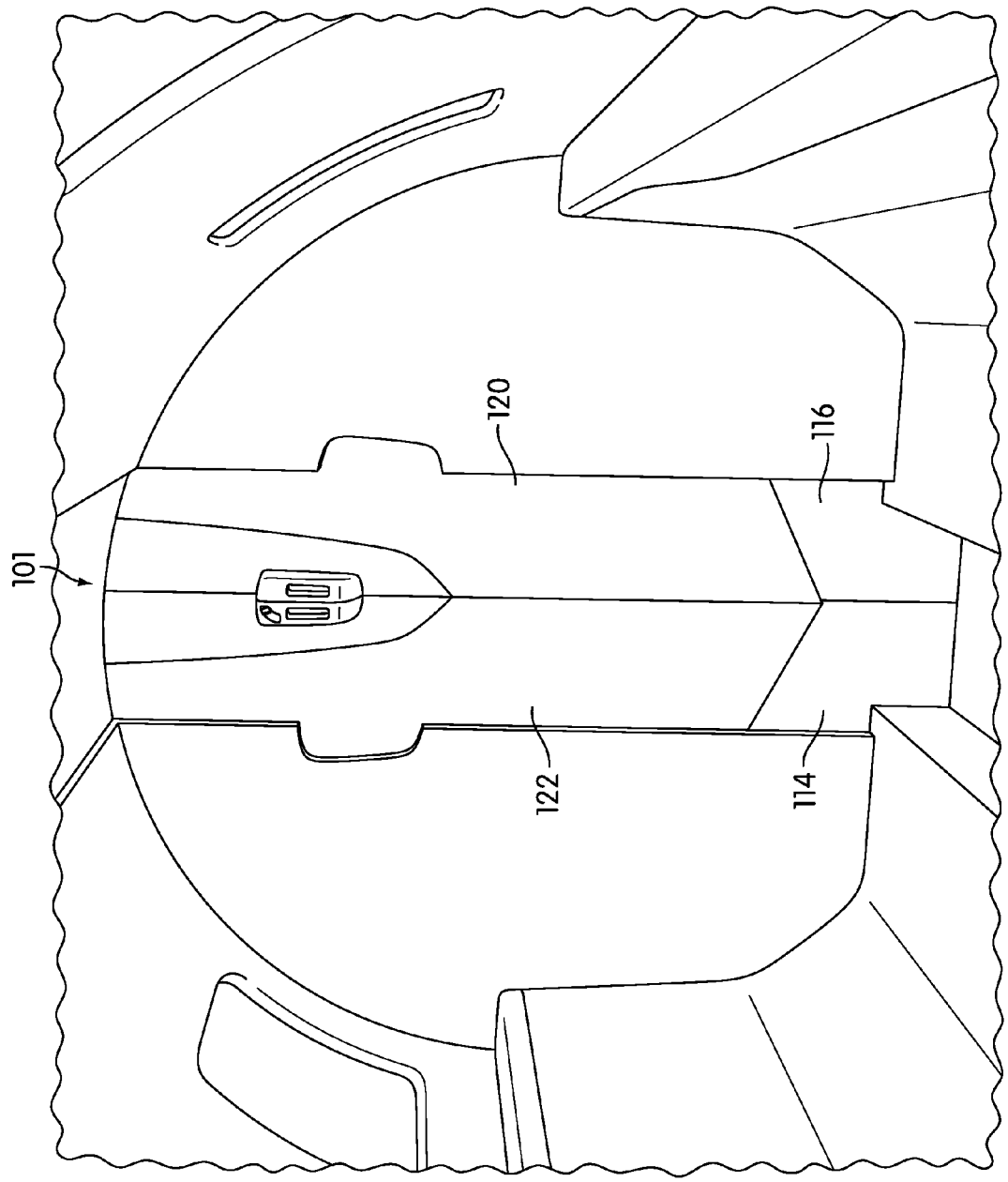
FIGS. 1-3 are schematic environmental diagrams of a prior art paneled partition assembly in a vehicle.

The present invention is directed to a partition assembly that selectively moves between a closed and extended position covering an opening, which can be an irregularly shaped doorway, to an open and retracted position, as well as intermediate positions in between. When the assembly is in a closed and extended position, the panels can cover the opening regardless of the opening's shape, size, or irregularity including covering a secondary opening extending from the main portion of the opening. When the partition assembly is in an open and retracted position, the panels are compactly stored including one or more of the panels being compactly stored within recesses formed in another panel and optionally within a wall portion forming the opening. In moving between the extended and retracted positions, the panels translate fluidly with minimal user interaction. Therefore, the paneled partition assembly is user friendly and ideal for areas where space is limited.

With respect to FIGS. 1-16, various features may be referred to using directional adjectives such as top, bottom, right, left, up, down, etc. These descriptions referring to the orientation of the device as illustrated in the drawings are for convenience and clarity, and should not be interpreted as limiting the scope of the invention in any way. It is understood that directional adjectives will change if it is viewed from a different orientation than as pictured.

To clearly understand aspects and features of the invention, as well as environments related to its usage and some of the differences from the prior art, some of the prior art is briefly discussed along with FIGS. 1-4, followed by generally discussing an example configuration and its operation shown in FIGS. 5-9. Aspects and details of various components and features of the example are described thereafter along with discussions for FIGS. 10-16.

Figure 2:
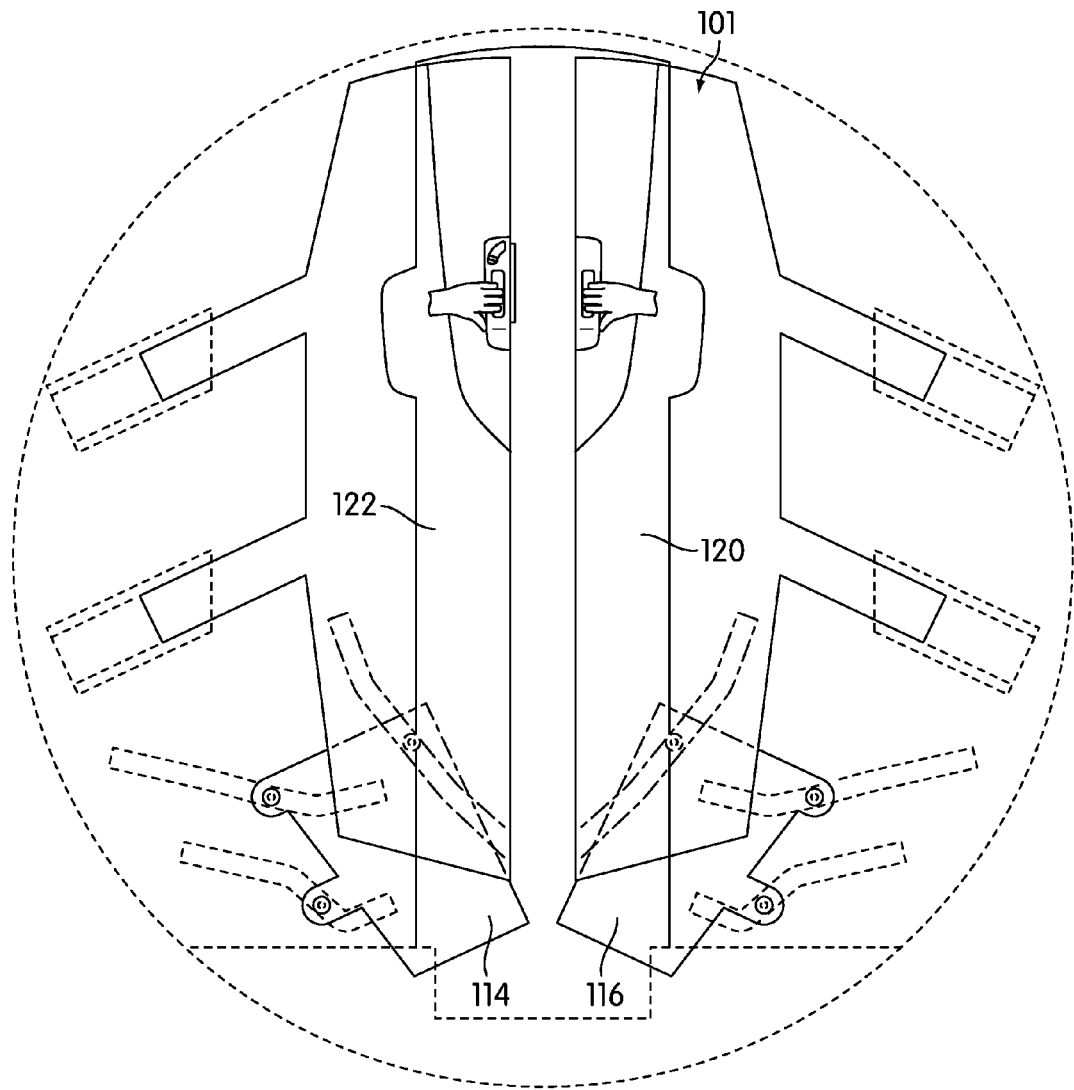
Figure 3:
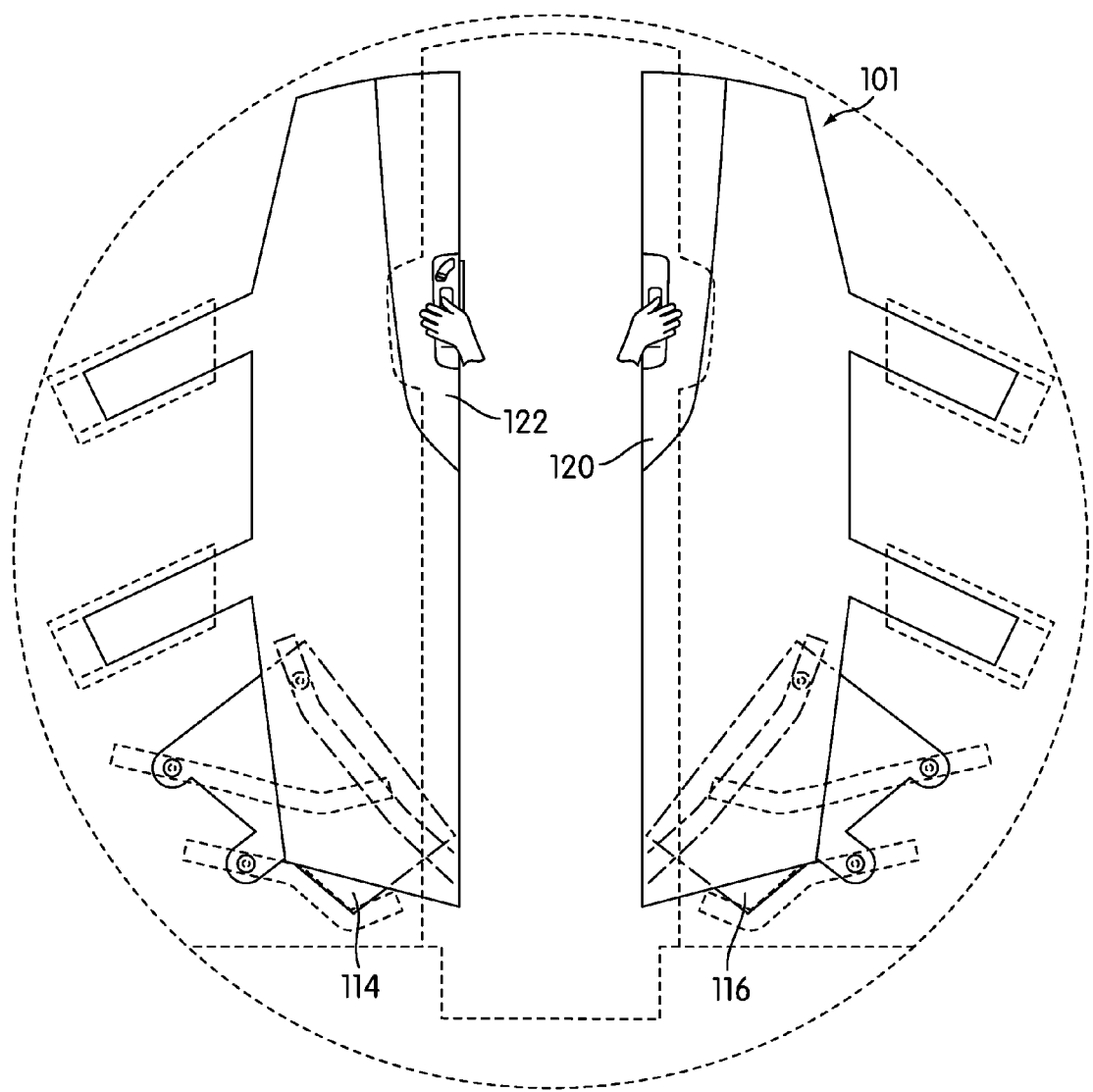

Referring now to FIGS. 1-3, a paneled partition assembly 101 is shown for a related type of assembly known in the art. Paneled partition assembly 101 is disclosed in U.S. Pat. No. 8,038,100 to Chris Osborne et al., which is incorporated herein by reference in its entirety. Paneled partition assembly 101 discloses environments, uses and settings for a known partition assembly that can be applicable for assemblies and systems discussed herein. In addition, paneled partition assembly provides a comparative example that helps identify some of the features noted herein for the present invention.

Paneled partition assembly 101 provides an example of an assembly that is generally configured to operate automatically to move from a closed position to an open position. Upon release of a lock 118 or other mechanism holding the door closed, doors of this type can move substantially automatically or with little user assistance to proceed through a series of actions for moving descenders or other extension panels 114 and 116 and the main panels 120 and 122 from their deployed positions to open positions. The automation can be provided via mechanical bias mechanisms, such as a weighted system. Although these systems can provide many advantages including being able to cover openings of complex or irregular shapes, the various motions, movements and mechanisms associated with these systems can increase the likelihood of malfunctions and increase their expense.

Figure 4:
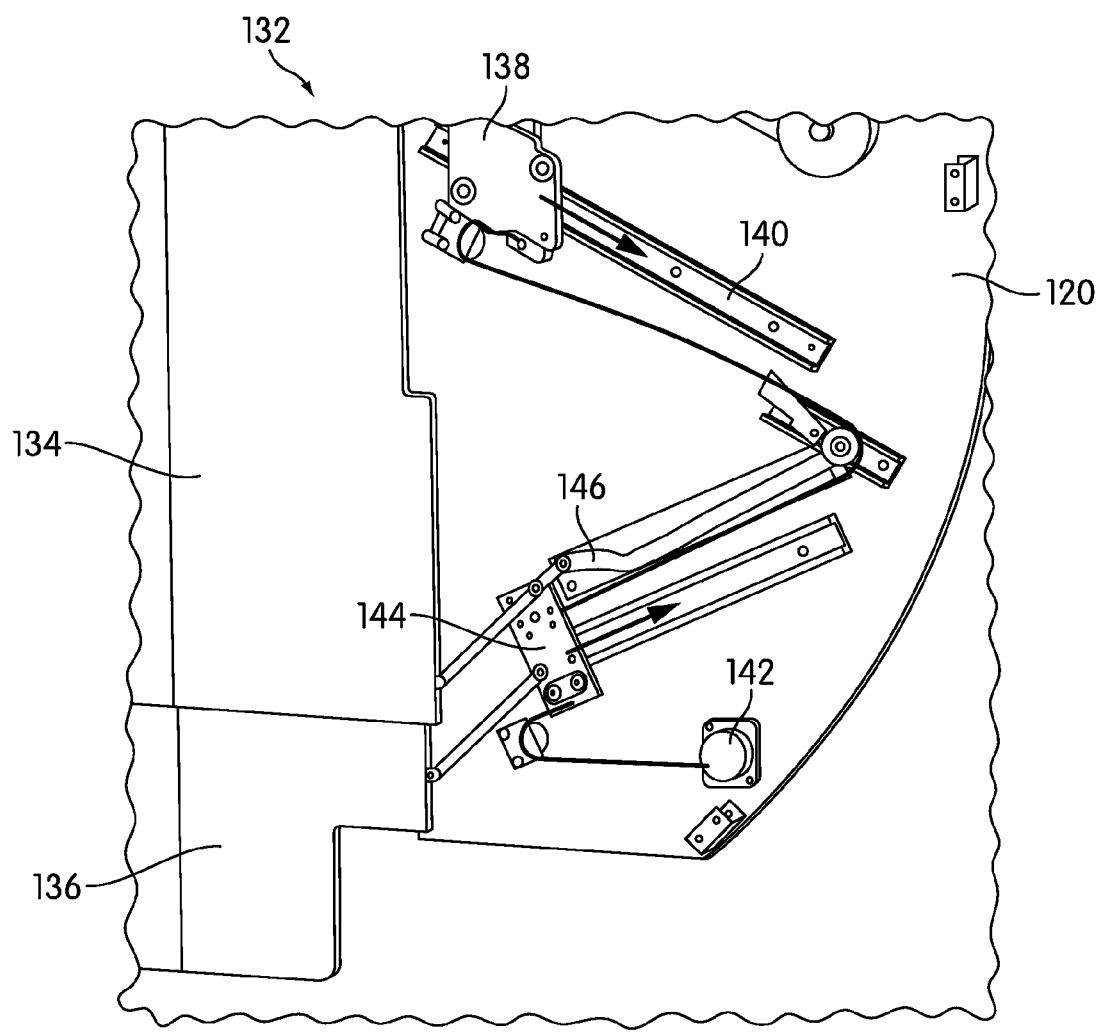
FIG. 4 is a schematic isometric view of a portion of another prior art paneled partition assembly shown with a cover panel removed.

FIG. 4 shows an exposed doorway support for another prior art automatic panel doorway assembly 132, which includes a main door panel 134 and a descender panel 136. When doorway assembly 132 is opened, various mechanical devices cooperate to raise and rotate descender panel 136 from its closed position to an open position. These devices include a descender trolley 138 on a track 140, a pre-loader 142, a guide plate 144, a guide slot 146, connecting cables etc. Although such configurations may be easy to operate, they are often prone to jam or otherwise malfunction. Further, such configurations can require gaps between mating descender panels in order to allow for their complex movements involving rotation mixed with translation etc., rather than a desirable system that fully covers an opening in a closed position.

Figure 5:
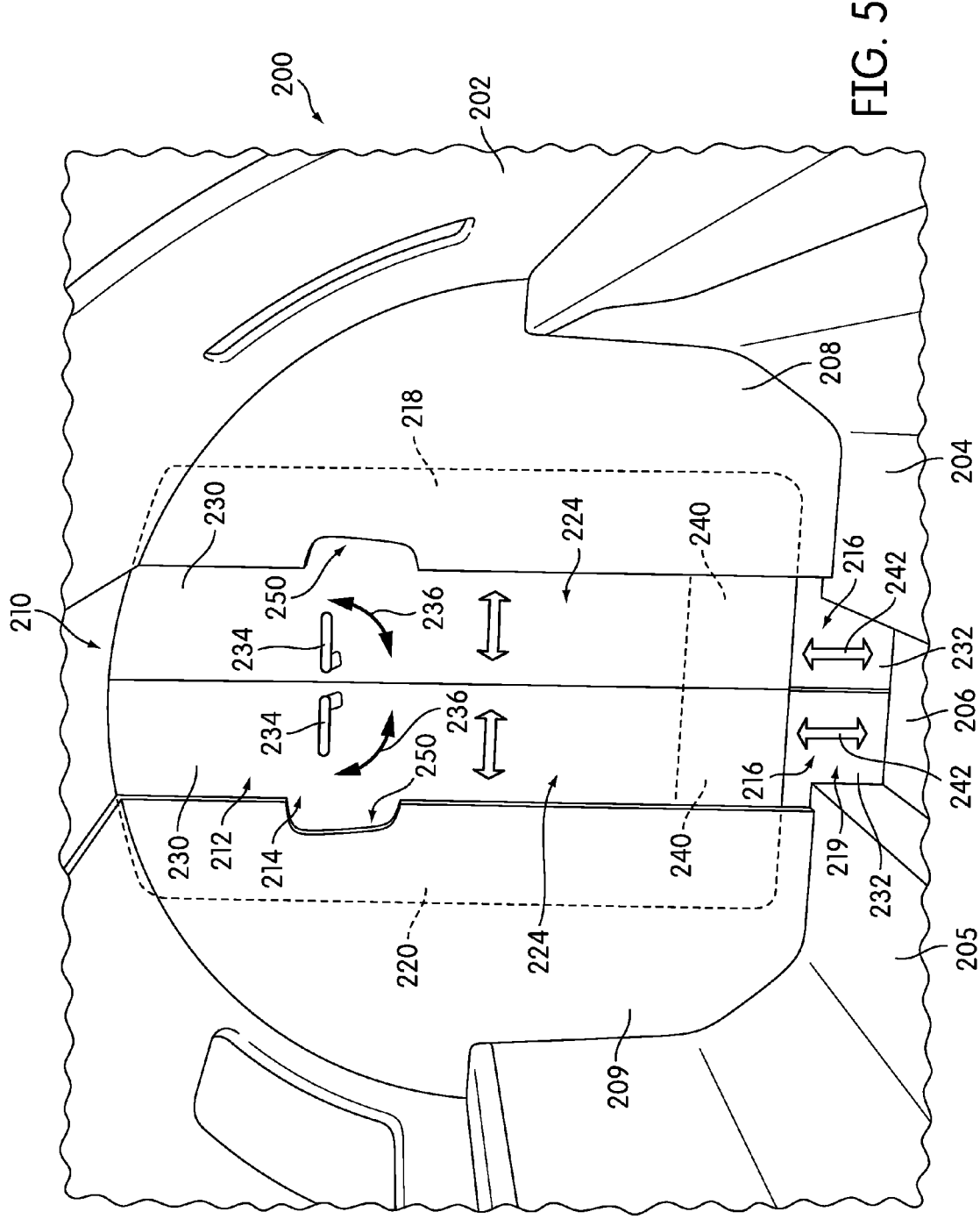
FIG. 5 is a schematic perspective view of a paneled partition assembly showing possible movements for some of the panels and related components.

Referring now to FIG. 5, a partition system 210 is generally shown as a schematic environmental diagram of an exemplary embodiment of a paneled partition assembly in a vehicle. Partition system 210 is shown configured for use in a vehicle, however, partitions can be configured to fit any type of space in vehicles, buildings, or other structures. Vehicle spaces tend to be more confined where space economy is required, and as such, partition system 210 is particularly suited for this type of application. In vehicles, particularly airplanes, ships and the like, the challenge is to provide a partition system that opens sufficiently in size for passage of people and equipment, but also closes sufficiently to provide complete separation of the two spaces. The panels must be configured to stow efficiently into very limited confines, yet operate smoothly and quickly to cover and uncover the opening. Moreover, in confined spaces, the opening may have an uneven size. That is, an aisle way for the floor may be stepped down from the main area of the opening, and the partition system must accommodate such irregularities in the opening. The illustrated embodiment is depicted on an airplane, but could be used in other spaces not limited to vehicles.

As shown in FIG. 5, airplane interior 200 for the example environment is defined by a fuselage 202 defining a compartment, which can be used as a seating area. Seats can be positioned and attached to top flat portions of right and left seating area platforms 204, 205. Seats are not illustrated in airplane interior 200 so that paneled partition assembly 210 is more easily viewed. Aisle 206 separates right and left seating area platforms 204, 205. The floor of aisle 206 is positioned lower than right and left seating area platforms 204, 205 so that passengers and crew have more headroom for maneuverability. Although the lowered aisle floor offers maneuverability advantages, it also adds design challenges with respect to separating the seating area from other cabin compartments. For example, it can provide for an irregularly shaped doorway or opening 212 having an upper main region 214 and a lower supplemental region 216 of differing lengths and widths, which can be difficult for a conventional doorway to cover.

To separate one compartment from another compartment, a partition or partition assembly can be used, through which doorway 212 is formed. As shown in the figures, the seating area is separated from another compartment by paneled partition assembly 210 that includes a cabin wall. The cabin wall is comprised of front wall portions 208, 209 and corresponding rear wall portions. Recesses 218 and 220 can be formed between each front wall portion and corresponding rear wall portion to permit storage of partition components and supporting structure as desired.

Partition assembly 210 can include a pair of opposing mating assemblies 224 that can each include a main panel 230, a descender or extension panel 232 and a rotatable handle 234, which can act as a driving member for retracting and deploying descender 232 and for opening and closing the main panels. When descenders 232 are deployed in the extended position shown, they cover secondary region 219 of the doorway without the need for gaps to accommodate rotation or other complex motions. Further, in the deployed positions shown, descenders 232 provide the benefit of locking partition assembly 210 in the closed position. In particular, descenders 232 interfere with seating platforms 204 and 205 to prevent any lateral movement in their deployed positions. Accordingly, descenders 232 can be retracted into recesses 240 formed within the main panels prior to moving the main panels. As shown by arrows 242 and discussed further hereafter, descenders 232 can move via linear motion into recesses 240 in response to rotational movement of handles 234 that drives their linear movement.

Arrows 236 show an example range of motion of handles 234 for driving the deployment and retraction of descenders 242. For the example shown, each handle 234 can rotate in an arc that is about ninety degrees. It is understood that other arcs and ranges of motion can be used. However, an arc of about ninety degrees provides for a relatively easy deployment and retraction operation of the descenders by the user. Further, as discussed along with FIGS. 12-14, such an arrangement can be accommodated in a compact and simple mechanical configuration retained primarily within the main panels. In addition, the configuration shown for the handles can allow them to be compactly stowed when the door is in the open position. In the present configuration, handles 234 are oriented substantially horizontally when descenders 232 are in their deployed or extended positions and are oriented substantially vertically when the descenders are in their retracted positions. As such, handles 234 can compactly fit within vertical recesses 250 formed within wall portions 208 and 209 when partition assembly 210 is in the open position.

Figure 6:
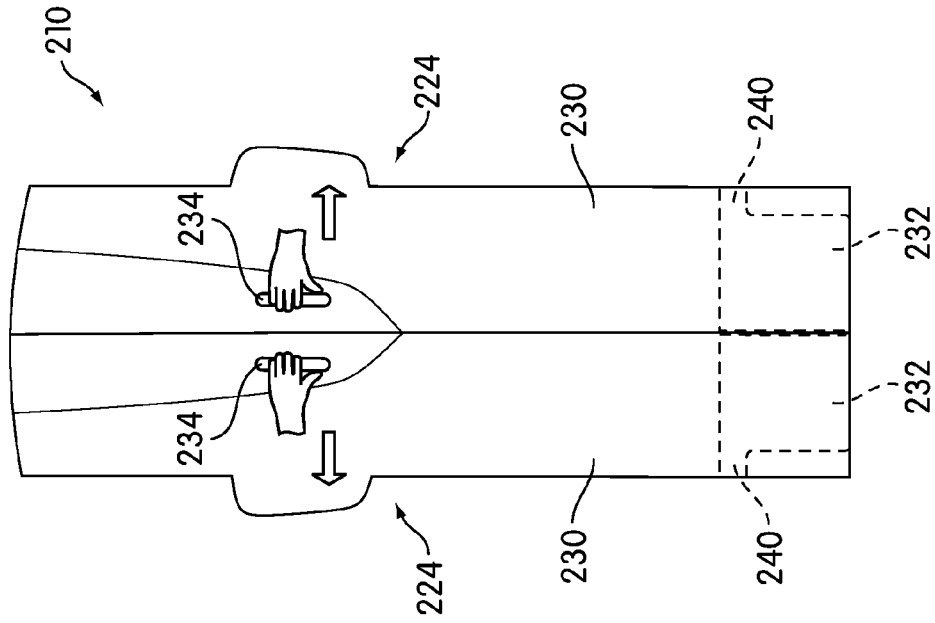
FIGS. 6-9 are schematic elevational views of the paneled partition assembly of FIG. 5 showing some of the actions and movements occurring for changing from the closed and extended position shown in FIG. 5 to an open and retracted position shown in FIG. 9.

FIGS. 6-9 illustrate how partition assembly 210 can move between the extended and closed position shown in FIG. 5 to a retracted and open position exposing the doorway. As shown in FIG. 6, a user can initiate moving the partition assembly 210 from the extended and closed position to a retracted and open position by rotating handles 234 in the direction of arrows 270 from a horizontal position corresponding with the deployed position for descender 232 to a vertical position. The rotation movement shown by arrows 270 cause descenders 232 to move linearly in a generally vertical direction as indicated by arrows 272.

Figure 7:
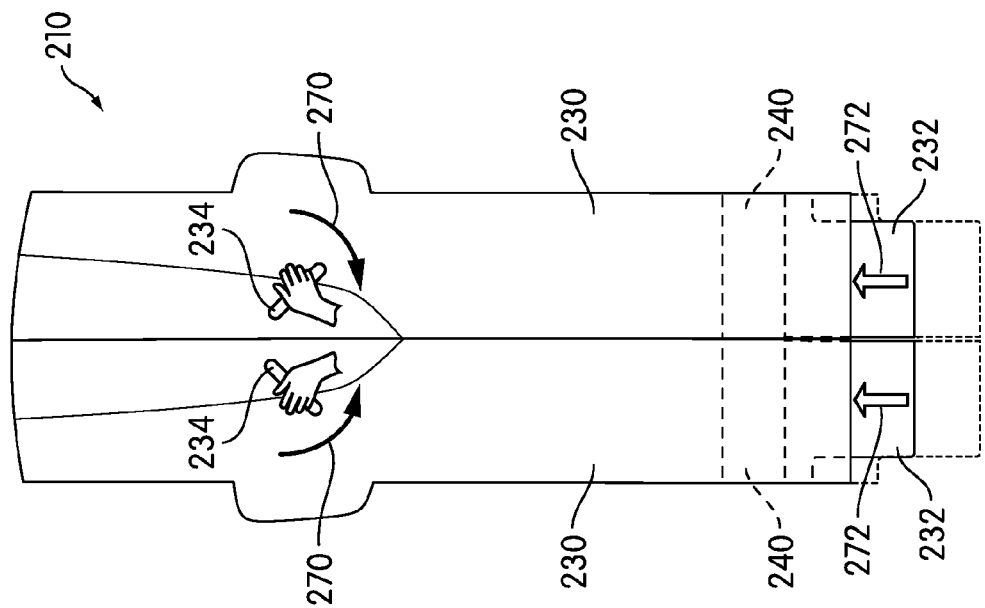

FIG. 7 shows partition assembly 210 after descender 232 has been moved into its retracted position. As the user continues rotating handles 234 as indicated in FIG. 6 through their range of motion until the handles are in a vertical orientation, descenders 232 continue to rise until they are each fully retracted into corresponding recess 240 formed within panel assembly 224. This occurs after about ninety degrees of rotation for the example configuration depicted. Partition assembly 210 can be configured to provide soft locks 273 (see FIG. 14) formed, for example, by permanent magnets 274 coupled with handle 234. Soft locks 273 can help retain partition assembly 210 in desired positions including retaining descender 232 in the extended or deployed position shown in FIG. 5, which can prevent handles 234 from inadvertently rotating out of position and partially exposing part of secondary opening 216.

In addition, they can provide the benefit of the feeling of a positive lock for the user, such as when they complete rotation of handles 234 as shown in FIG. 7 and sense the handles "clicking" into place at conclusion of its arc indicating to the user full retraction of descender 232. Further, they can aid retention of main panels 230 in the closed position shown in FIG. 7 until the user is prepared to move the main panels. Soft locks 273 could do so, for example, by providing a magnetic attraction between leading edge portions 276 of main panels 230. This could provide the added benefit of keeping lateral pressure off of descenders 232 while being retracted, which could occur if the main panels attempt to translate and place the descenders into interferences positions against the seating platforms 204, 205 (FIG. 5).

After descenders 232 have been retracted, main panels 230 can be moved to their open positions without descenders 232 interfering with the seating platforms. Partition assembly 210 can optionally be configured to include restraint mechanisms to prevent movement of main panels 230 from their closed position until descenders 232 have moved to their retracted position. This could be done, for example, via a spring lock (not shown) in main panel 230 that is mechanically released upon full retraction of descender 232. However, descenders 232 generally prevent main panels 230 from moving out of their closed position if deployed due, simply, to interference with seat platforms 204 and 205 or other features creating the irregular opening they are designed to cover.

Main panels 230 can be opened by the user applying lateral force to handles 234 to push or pull the main panels toward their open position, which causes the main panels to laterally translate into their storage recesses 218 and 220 (FIG. 5). When the user has pushed or pulled main panels 230 into their storage recesses 218 and 220 to place them into their open positions, handles 234 can optionally be retained in handle recesses 250 that prevent the handles from interfering with wall portions 218 and 220 and unduly limiting travel of the main panels.

As with the closed position, soft locks can be provided to retain partition assembly 210 in its open position, such as soft locks configured to connect with portions of main panels within their storage recesses 218 and 220 or to connect with handles 234 when in their storage recesses 250. Further, as shown in FIGS. 10 and 11, mechanical locks or other restraining mechanisms can be used to maintain the open position, such as via hooks 280 formed at rear portions of main panels 230, which can engage latch features upon being fully moved into their storage recesses.

Figure 9:
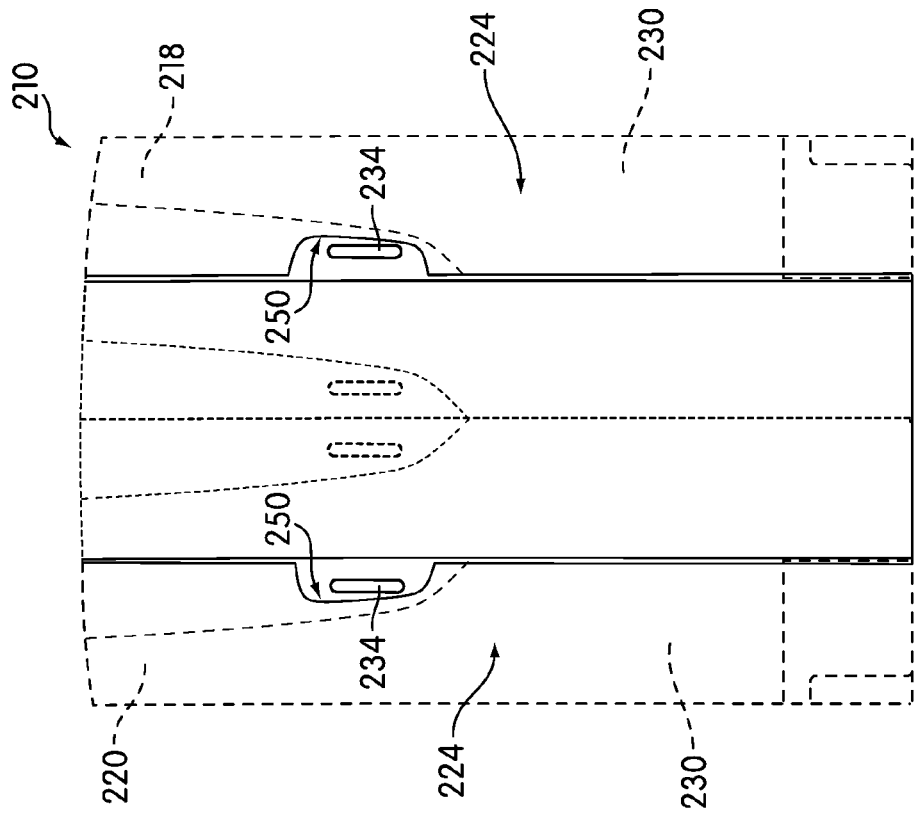

FIG. 9 also depicts an advantage of configuring handles 234 to be disposed vertically when descenders 232 are retracted. As shown, handle recesses can be relatively small to easily accommodate handles 234 in a vertical orientation to prevent any interfering contact between the handles and wall portions, which would be much more difficult to accommodate for the handles in a horizontal orientation.

Figure 10:
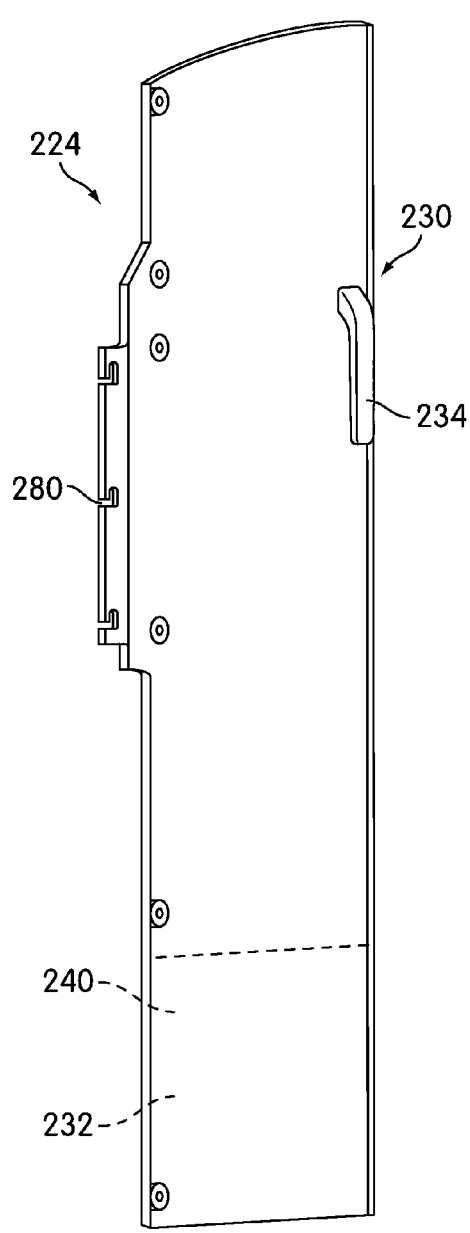
FIG. 10 is a schematic perspective view of a main panel of the paneled partition assembly of FIG. 5 shown with the descender in the retracted position.
Figure 11:
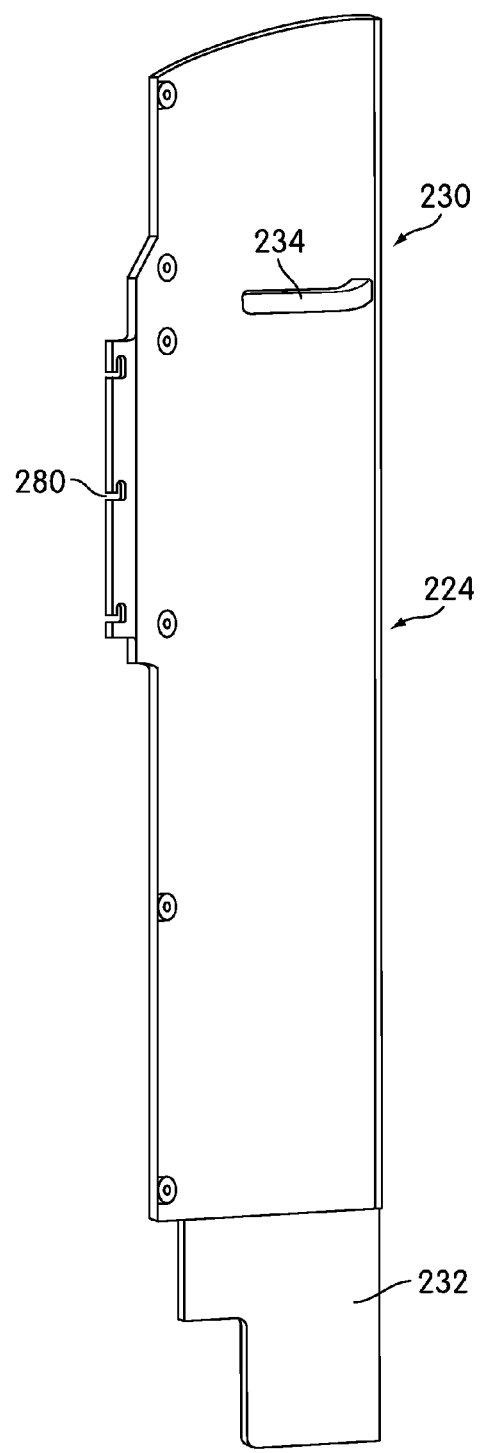
FIG. 11 is a schematic perspective view of a main panel of the paneled partition assembly of FIG. 5 shown with the descender in the extended position.

FIGS. 10-16 depict example internal components, their operations and related features of assemblies 224 during use including during their movement between the open and retracted positions and closed and extended positions discussed along with FIGS. 6-9. FIG. 10 generally shows the configuration of assemblies 224 corresponding with FIGS. 7-9 when descenders 232 are in their retracted positions, which can include main panels 230 being in either in their open or closed positions, or in a position in between. FIG. 11 depicts the configuration of assemblies 224 corresponding with FIG. 5 when in the closed and extended position. As such, handle 234 is horizontally oriented and descender 232 is extended out of recess 240.

Figure 8:
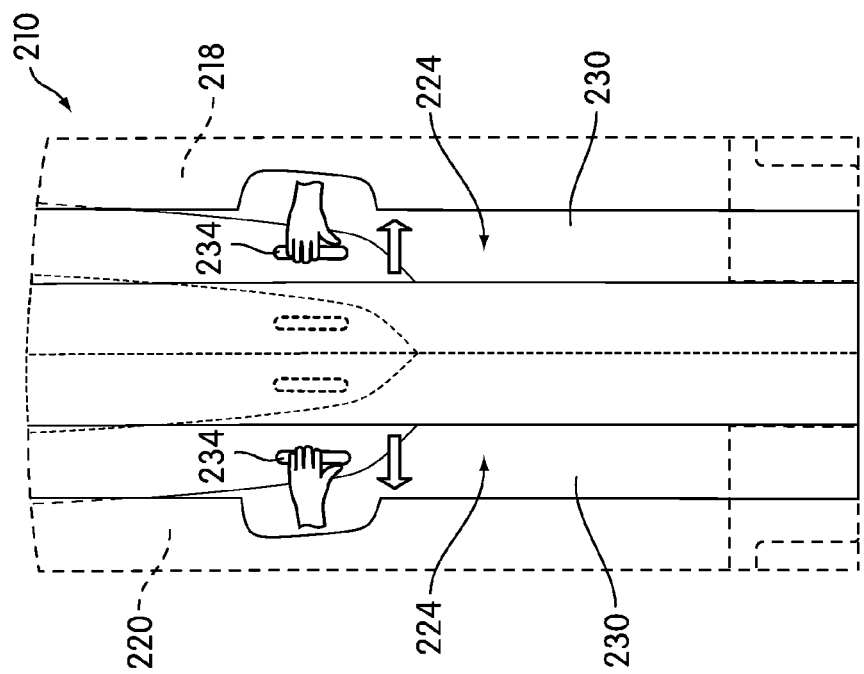
Figure 12:
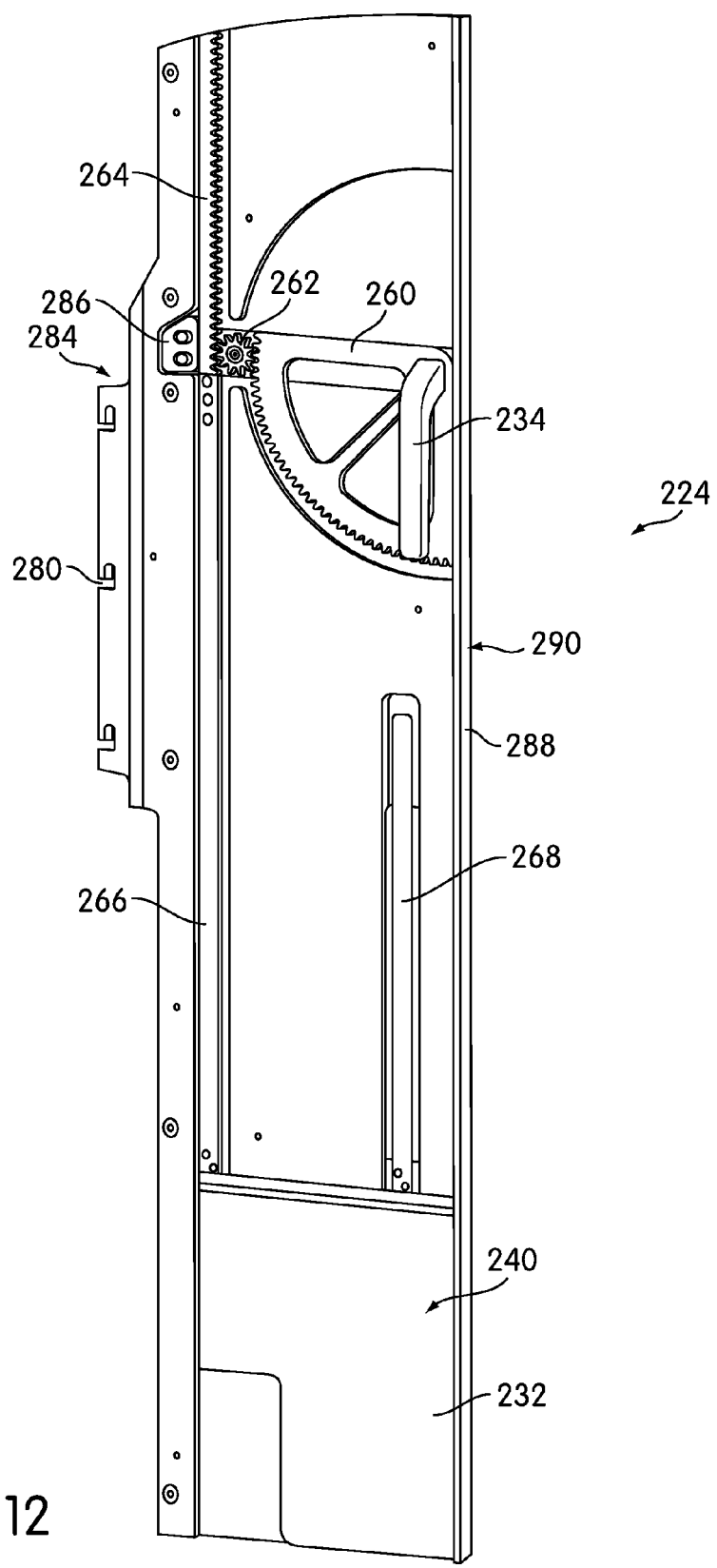
FIG. 12 is a schematic perspective view of the main panel of FIG. 10 shown with its outer covering removed.
Figure 13:
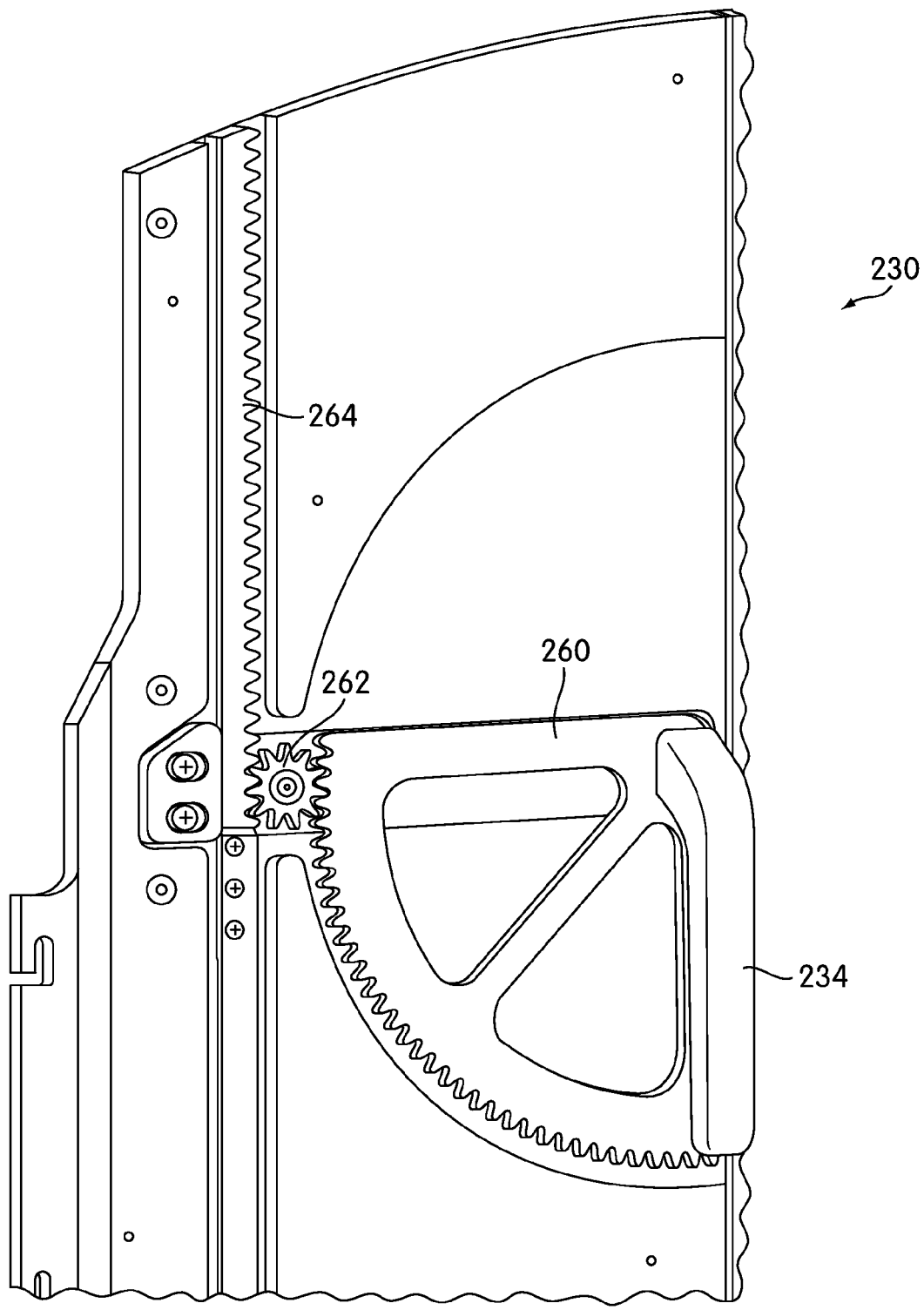
FIG. 13 is a schematic perspective view of an upper region of the main panel of FIG. 10 shown with its outer covering removed.

FIGS. 12 and 13 correspond with FIG. 10, as well as FIGS. 7-9, which shows one of assemblies 224 with an outer covering removed to shown its internal components. As noted above for FIG. 10, the configuration depicted for FIGS. 12 and 13 occurs while descender 232 is in its retracted position, which would primarily occur in the open position while assembly 224 was retained within its storage recess 218, 220, but also occurs during movement between the open position and closed position excluding partially or fully deploying descenders 232 while in the closed position. Although descender 232 is not deployed for the configuration of FIGS. 12 and 13, these drawings do depict the general components of a deployment system 284, as well as their configuration and relationships with each other.

Deployment system 284 generally includes handle 234, a gear quadrant 260, a pinion 262, a gear rack 264, descender 232 and a connecting link 266. As discussed previously, handle 234 can act as a driving member to cause linear movement of descender 232 when it receives rotational movement. It does so by rotating gear quadrant 260 disposed inside of main panel 230 in the same direction and amount that it is being rotated, Gear quadrant 260 in turn rotates pinion 262, which changes the direction of rotation while also translating its rotational movement into linear movement to move gear rack 264 and descender 232 connected to it via connecting link 266.

Gear quadrant 260 is a ninety degree portion (quadrant) of a gear attached to the handle to rotate with it. Although shown as a portion of a gear, it is understood that a full circular gear could be used and that a portion of a gear covering more or less than a quadrant can be used for other configurations. However, a gear quadrant can provide advantages for the present configuration, such as allowing for the use of a large sized gear in a relatively small area. Because the range of motion is only ninety degrees, a gear quadrant can be used within a space of half the diameter of the full gear and still allow for the full 180 degree range of motion. Further, a relatively low gear ratio can be provided using a larger-sized gear via use of the gear quadrant, which enables a user to rotate the handle with ease to raise and lower descender 232 with little effort. This can be an important factor for many users regarding use of the manually-driven system of partition assembly 210 versus automated systems.

Pinion 262 allows the direction of rotation to be reversed, which permits the desired handle configuration and positions of the handle for the deployed and retracted descender positions. In addition, pinion 262 translates its rotational movement into translational movement based on its rack and pinion arrangement with gear track 264. A preload guide block 286 can be disposed on an opposite side of gear track 264 from pinion 262 to provide support for its translating connection with the pinion, as well as to preload the gear assembly as necessary to ensure secure contact between gear teeth and smooth operation of the deployment system 284.

When handle 234 experiences rotational movement, it is smoothly and easily translated into linear vertical movement of gear rack 264, which connects to descender 232 via connecting link 266 to move the descender in direct relation to its movements. Thus, gear rack 264 translates descender in the same direction and amount of movement as it is translated due to rotation of handle 234. A guide bar shown in FIG. 12 can also be used to guide movement of descender 232 to ensure it moves linearly with guide rack 264. Edge trim 288 can also be included, which is a guide along an inner forward edge of deployment system 284 that can also guide descender 232 to maintain linear motion, as well as provide framework for the system. In addition, it can provide a stop for rotation of gear quadrant 260 and a magnetic surface for permanent magnets 274.

Magnets 274 can be mounted on gear quadrant 260 at each side of the quadrant to connect with leading edge portions 276 at either end of its range of motion and provide a soft lock 273 for the deployment position. Such a connection can provide the user with an indication that the desired range of motion for retracting or deploying the descender is complete, as well as help retain descender 232 in its deployment position. Optionally, magnets 274 can also be placed at other locations along leading edge portions 276 to help retain main panel 230 in its closed configuration when mated with the opposite partition assembly. It can do so via magnets 274 disposed on leading edge portions 276 of the main panels being arranged to have opposite poles for attraction with corresponding magnets.

Figure 14:
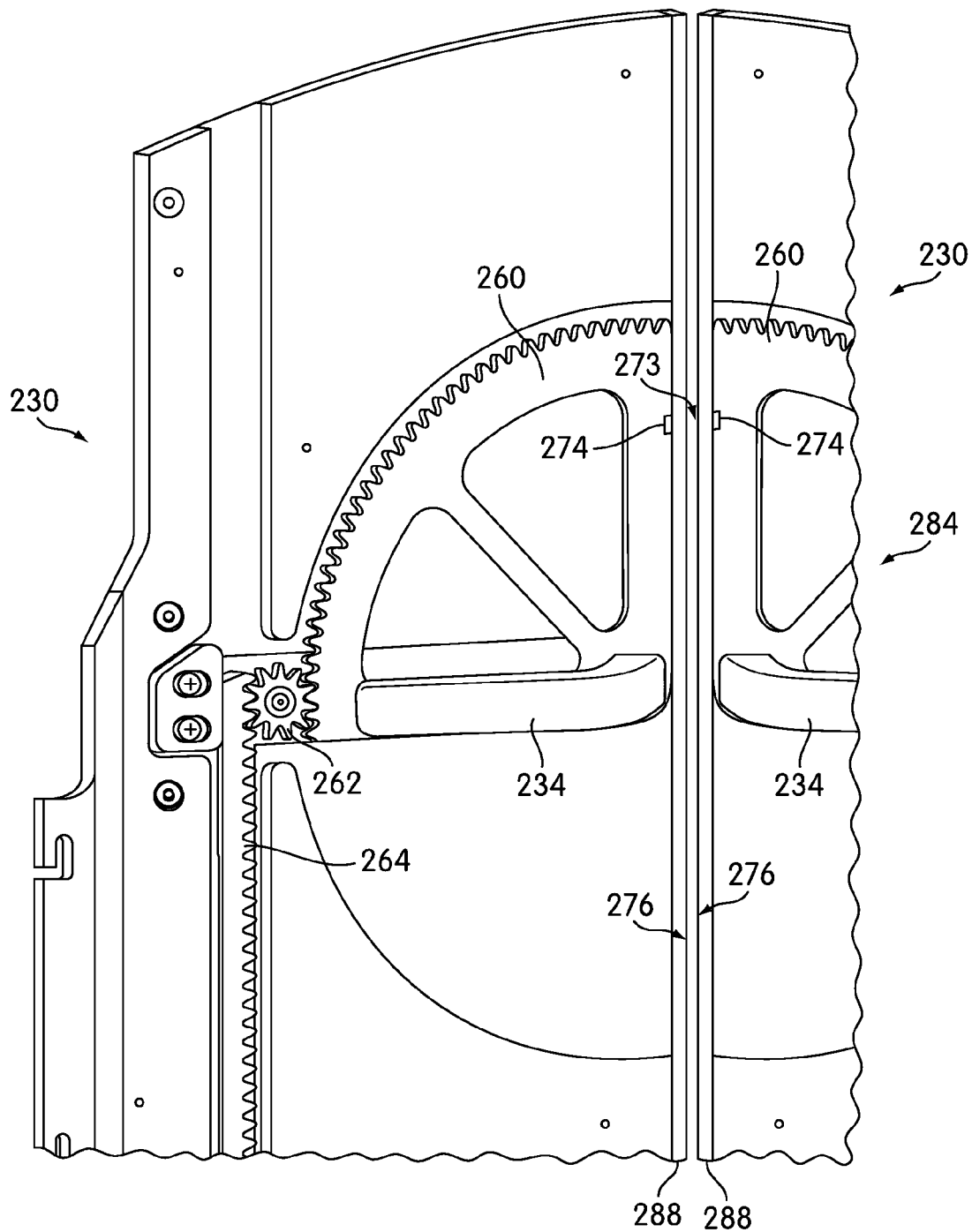
FIG. 14 is a schematic perspective view of an upper region of the main panel of FIG. 11 shown with its outer covering removed and also showing a portion of an opposite main panel abutting it in the closed position.

Referring now to FIG. 14, upper portions of the mating pair of assemblies 224 are shown with their covers removed to expose internal components including portions of deployment system 284, FIG. 14 is similar to FIGS. 12 and 13, except that it shows both assemblies 224 when mated and in the closed and deployed position. Accordingly, leading edges portions 276 of the opposing pairs abut against each other and optional magnets 274 can act as a soft lock 273 to help retain them in the closed position. Further, handles 234 are oriented horizontally according to the descender 232 being in its extended position. Likewise, gear quadrants 260 have both been rotated to be at the upper portion of theft rotation arcs and the gear rack 264 shown has, thus, been translated downward due to rotation of its corresponding gear quadrant and pinion 262 disposed therebetween.

Figure 15:
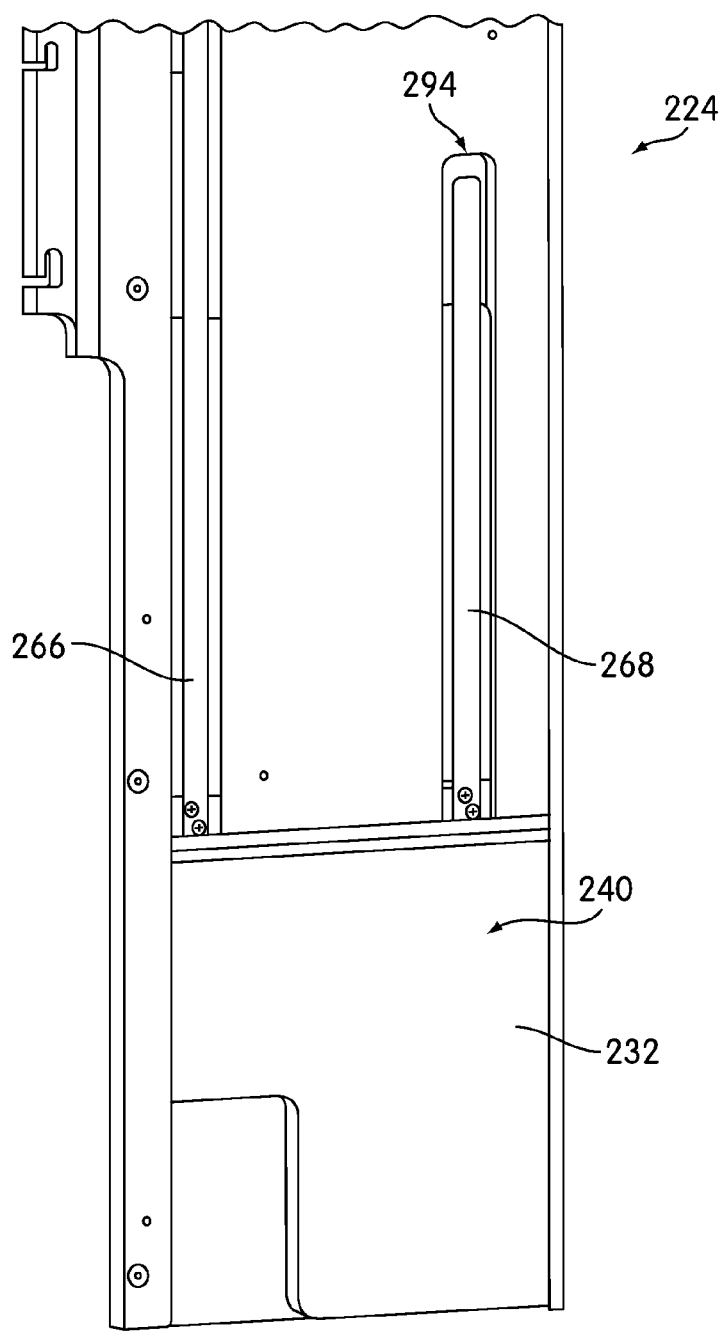
FIG. 15 is a schematic perspective view of a lower region of the main panel of FIG. 10.
Figure 16:
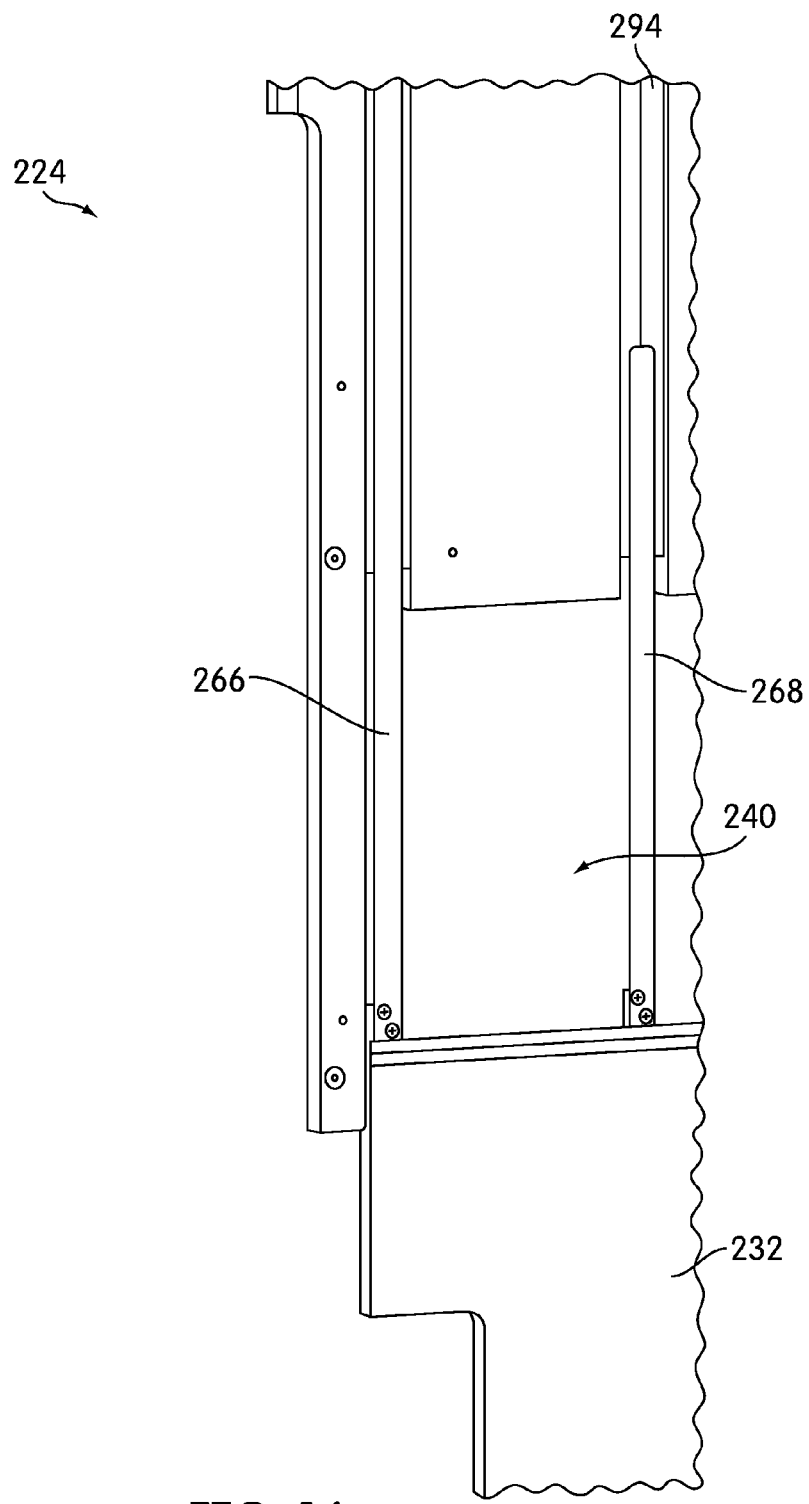
FIG. 16 is a schematic perspective view of a lower region of the main panel of FIG. 11 with the descender in an extended position.

FIGS. 15 and 16 show lower regions of assembly 224 corresponding with the examples of FIGS. 12 and 13 (FIG. 15) and FIG. 14 (FIG. 16) with their covers removed to similarly expose theft inner components and portions of deployment system 284. Accordingly, in FIG. 15, gear rack 266 is shown connected with descender 232 while it is retained within recess 240 and guide bar 268 is shown completely retained with its slot 294. In comparison, FIG. 16 shows descender 232 in its extended position extending out of recess 240, gear rack 266 similarly extended, and guide bar 268 extends out of its slot 294.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A partition assembly adapted to selectively separate a first space from a second space, said assembly comprising:
   a wall portion defining an opening; and
   a plurality of panels arranged in communication with said wall portion and each other to selectively cover said opening when said plurality of panels are in a closed and fully extended position and to uncover said opening when said plurality of panels are in an open and retracted position, said plurality of panels comprising:
      a first panel having a selectively rotatable handle disposed thereon configured to rotate between a fully extended first position and a retracted second position;
      a second panel configured as a following panel and coupled with said first panel and said handle such that rotational movement of said handle causes linear movement of said second panel;
      wherein the second panel comprises an extension of the first panel and at least one recess is provided in the first panel to receive the extension;
      wherein the extension is configured to translate between being fully retained within the recess while in the retracted second position and being substantially disposed out of the recess in the fully extended first position; and
      wherein the first panel and the second panel side along the same single lane from the closed and full extended position to the open and retracted position.

2. The partition assembly according to claim 1, wherein a 90 degree rotational movement of the handle causes linear movement of the second panel to the fully extended first position.

3. The partition assembly according to claim 1, wherein the linear movement of the second panel is vertical movement.

4. The partition assembly according to claim 1, wherein said wall portion forms a main opening at an upper region of said opening and a bottom opening at a lower region of said opening, and said extension is configured to linearly translate between said retracted second position exposing said bottom opening and said fully extended first position covering said bottom opening.

5. The partition assembly according to claim 4, wherein said first panel is configured to linearly translate between said open position exposing said main opening and said dosed position covering said main opening only while said second panel is fully retained within said recess.

6. The partition assembly according to claim 5, wherein said second panel is restricted from extending out of said retracted second position except when said first panel is in said closed position.

7. The partition assembly according to claim 1, further comprising:
   a first gear portion connected to said handle and configured to rotate with said rotational movement of the handle; and
   a gear track in communication with said first gear portion and said second panel, said gear track being configured to drive said linear movement of the second panel;
   wherein said first gear portion is configured to communicate said rotational movement of the handle to said gear track and cause said gear track to translate linearly.

8. The partition assembly according to claim 7, further comprising a pinion in communication with said first gear portion and said gear track, said pinion configured to translate said rotational movement of the handle into linear movement for driving said second panel.

9. The partition assembly according to claim 8, wherein said pinion is configured to reverse a drive rotation direction of said rotational movement of the handle into an opposite driven rotation direction.

10. The partition assembly according to claim 8, wherein said rotational movement of the first gear portion, said movement of the pinion, said linear movement of the second panel and linear translation of the gear track lie within a plane of said first panel.

11. The partition assembly according to claim 10, wherein said gear portion, said gear track, and said pinion are disposed within said first panel.

12. The partition assembly according to claim 1, wherein said first panel is configured to move along a main direction of travel for moving between said open and closed positions, and said handle is configured to be oriented substantially perpendicular to said main direction of travel at said retracted second position.

13. The partition assembly according to claim 1, further comprising a soft lock system configured to retain said first panel in said closed position.

14. The partition assembly according to claim 13, wherein said soft lock system comprises a plurality of permanent magnets biasing said first panel to remain in said closed position.

15. The partition assembly according to claim 13, wherein said soft lock system is further configured to selectively retain said second panel in said fully extended first position and said retracted second position.

16. A vehicle partition assembly adapted to selectively separate a first space from a second space, said assembly comprising:
   a vehicle cabin wall portion defining an opening having a main portion at an upper region and a descender portion at an opposite lower region, said cabin wall opening forming a first recess at a first side of said opening and a second recess at an opposite second side of said opening; and a pair of panel assemblies including a first panel assembly and a second panel assembly, each one of the panel assemblies comprising:
- a main panel configured for selective linear movement between an open position disposed within one of said first and second recesses and a closed position extending out of one of said first and second recesses, said main panel having a leading edge portion and defining a descender recess;
- a descender panel configured for selective linear movement between a retracted position disposed within said descender recess and a deployed position extending from said descender recess; and
- a driving member on said main panel configured for selective movement between a deployed descender position and a retracted descender position;

wherein, for each one of said panel assemblies, said driving member comprises a handle configured for rotational movement between a first position comprising said deployed descender position and a second position comprising said retracted descender position, wherein said leading edge portions for the first and second main panels of said panel assemblies abut each other when in said closed position, and said first and second main panels are configured to cover said main portion of the opening when in said closed position.

17. The vehicle partition according to claim 16, wherein each of said partition assemblies further comprise:
- a gear quadrant connected to said handle and configured to rotate with said rotational movement of the handle;
- a gear track in communication with said gear quadrant and said extender, said gear track being configured to drive said linear movement of the extender; and
- a pinion in communication with said gear quadrant and said gear track, said pinion configured to translate said rotational movement of the handle into linear movement for driving said descender and to reverse a drive rotation direction of said rotational movement of the handle into an opposite driven rotation direction;
- wherein said gear quadrant is configured to communicate said rotational movement of the handle to said gear track and cause said gear track to translate linearly.

18. The vehicle partition according to claim 17, wherein, for each of said partition assemblies, said rotational movement of the gear quadrant, said movement of the pinion, said linear movement of the descender and linear translation of the gear track lie within a plane of said main panel, and said gear quadrant, said gear track, and said pinion are disposed within said main panel.

19. A door assembly for a composite door opening defined by a wall portion, said wall portion defining a main region of said composite door opening having a first length and a first width and a secondary region of said composite door having a second length and a second width that are different from the first length and first width, said door assembly comprising;
- a pair of panel assemblies attached to said wall portion on opposite sides of said main region of the composite door opening, said pair of panel assemblies including a first panel assembly and a second panel assembly, each one of the panel assemblies comprising:
  - a main panel configured for selective linear movement between an open position exposing said main region and a closed position covering said main region, said main panel having a leading edge portion and defining an extension recess;
  - an extension panel configured for selective linear movement between a retracted position disposed within said extension recess and a deployed position extending from said extension recess; and
  - a driving member on said main panel configured for selective movement between a deployed extension position and a retracted extension position;

wherein, for each one of said panel assemblies, said driving member comprises a handle configured for rotational movement between a first position comprising said deployed extension position and a second position comprising said retracted extension position, wherein said leading edge portions for the first and second main panels of said panel assemblies abut each other when in said closed position, and said first and second main panels are configured to cover said main region of the composite door opening when in said closed position.

20. The door assembly according to claim 19, wherein each of said partition assemblies further comprise:
- a gear quadrant connected to said handle and configured to rotate with said rotational movement of the handle;
- a gear track in communication with said gear quadrant and said extender, said gear track being configured to drive said linear movement of the extender; and
- a pinion in communication with said gear quadrant and said gear track, said pinion configured to translate said rotational movement of the handle into linear movement for driving said descender and to reverse a drive rotation direction of said rotational movement of the handle into an opposite driven rotation direction;
- wherein said gear quadrant is configured to communicate said rotational movement of the handle to said gear track and cause said gear track to translate linearly.

* * * * *